United States Patent [19]

Diver et al.

[11] 4,142,624
[45] Mar. 6, 1979

[54] BREAD ACCUMULATOR

[75] Inventors: James J. Diver, South Holland; Henry A. Heide, Addison, both of Ill.; Basil J. Masse, Carrollton, Tex.

[73] Assignee: Velten & Pulver, Inc., Chicago Ridge, Ill.

[21] Appl. No.: 828,881

[22] Filed: Aug. 29, 1977

[51] Int. Cl.² ................. B65G 17/24; B65G 47/30
[52] U.S. Cl. ................................. 198/425; 198/779
[58] Field of Search ............ 198/425, 779, 781, 857

[56] References Cited

U.S. PATENT DOCUMENTS

| 2,771,177 | 11/1956 | Cutter et al. | 198/425 |
| 3,768,630 | 10/1973 | Inwood et al. | 198/781 |
| 3,894,627 | 7/1975 | Jabbusch et al. | 198/779 |
| 3,995,735 | 12/1976 | Risley | 198/425 |
| 4,003,466 | 1/1977 | Muth et al. | 198/779 |

FOREIGN PATENT DOCUMENTS 254046  10/1962  Australia ............................ 198/779

Primary Examiner—Robert B. Reeves
Assistant Examiner—Jeffrey V. Nase

Attorney, Agent, or Firm—Vogel, Dithmar, Stotland, Stratman & Levy

[57] ABSTRACT

An apparatus for accumulating into a group a series of spaced-apart loaves of bread in a bakery conveying line comprises an entry conveyor and an exit conveyor each including a driven belt of interconnected free rollers. Upon the arrival of the first loaf at the exit end of the exit conveyor, the exit conveyor is stopped, with succeeding loaves accumulating behind the first loaf under the continued action of the entry conveyor to form a contiguous group which fills first the exit conveyor and then successive zones of the entry conveyor. As each zone is filled, a corresponding shoe is moved into engagement with the rollers passing through that zone for rotating them to counteract the movement of the entry conveyor belt and relieve pressure on the accumulated loaves. When downstream equipment calls for more loaves, the exit conveyor is restarted and the shoes are removed from the rollers in all but the last zone, and simultaneously another shoe momentarily engages those rollers to stop the counter-rotation thereof and the accumulated group is conveyed from the accumulator. Subsequently the shoe in the last zone is disengaged to restart the cycle.

10 Claims, 11 Drawing Figures

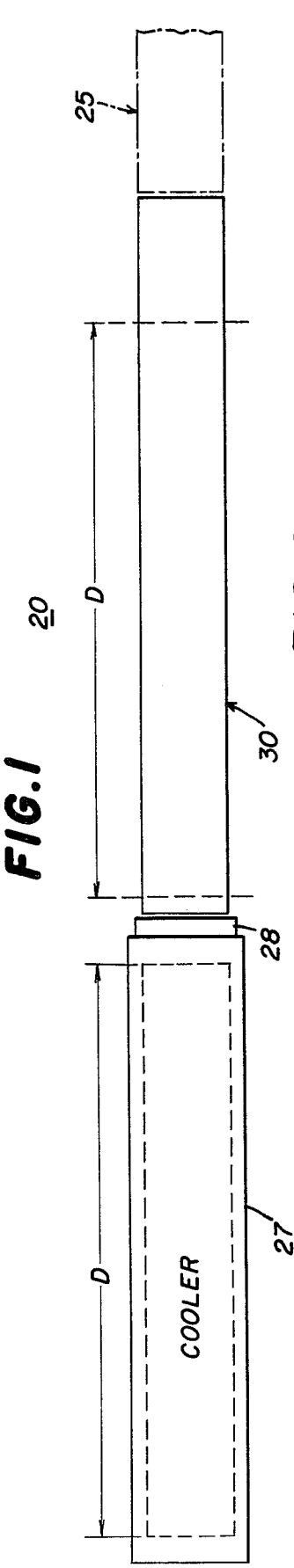
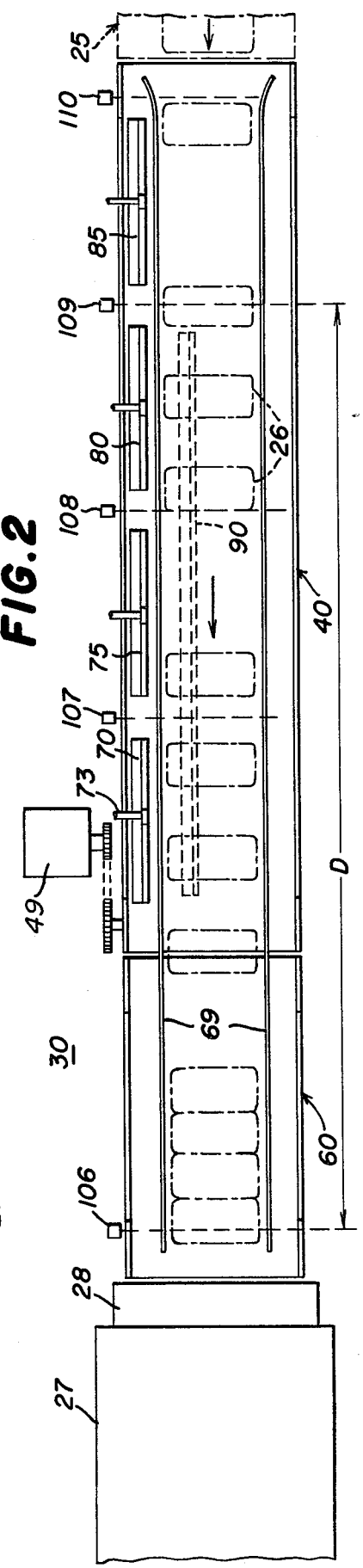
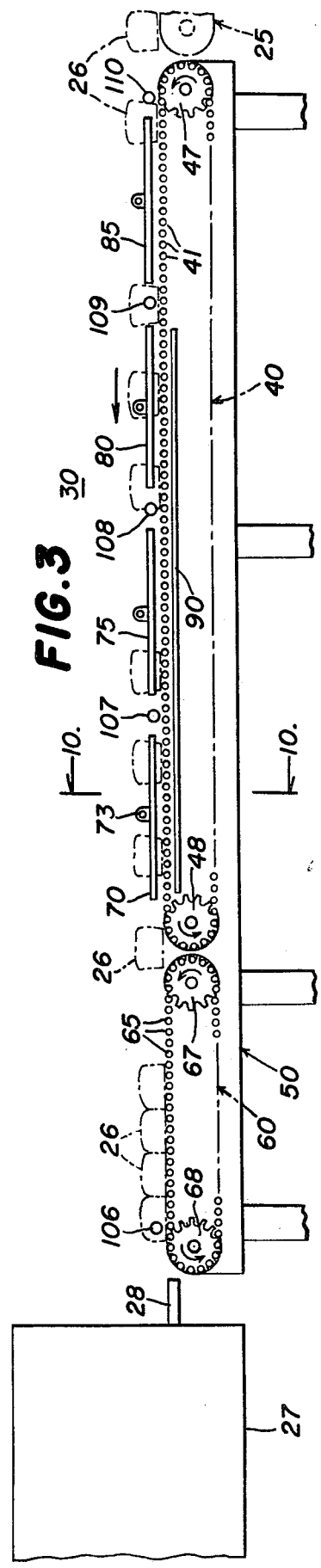

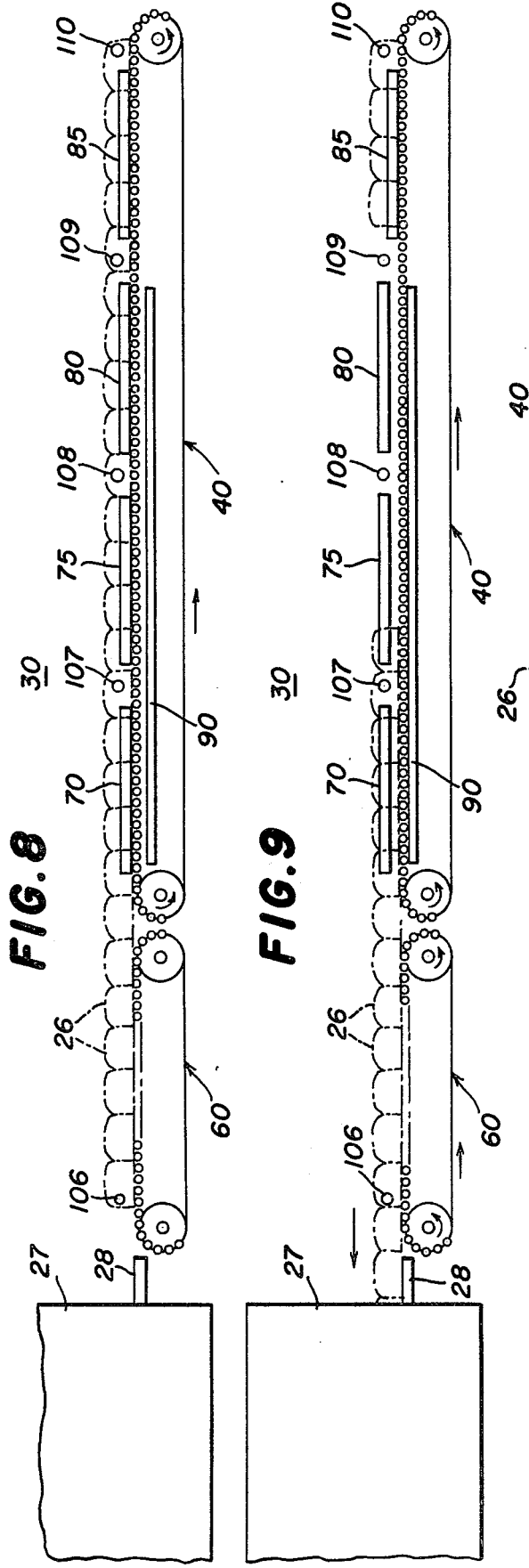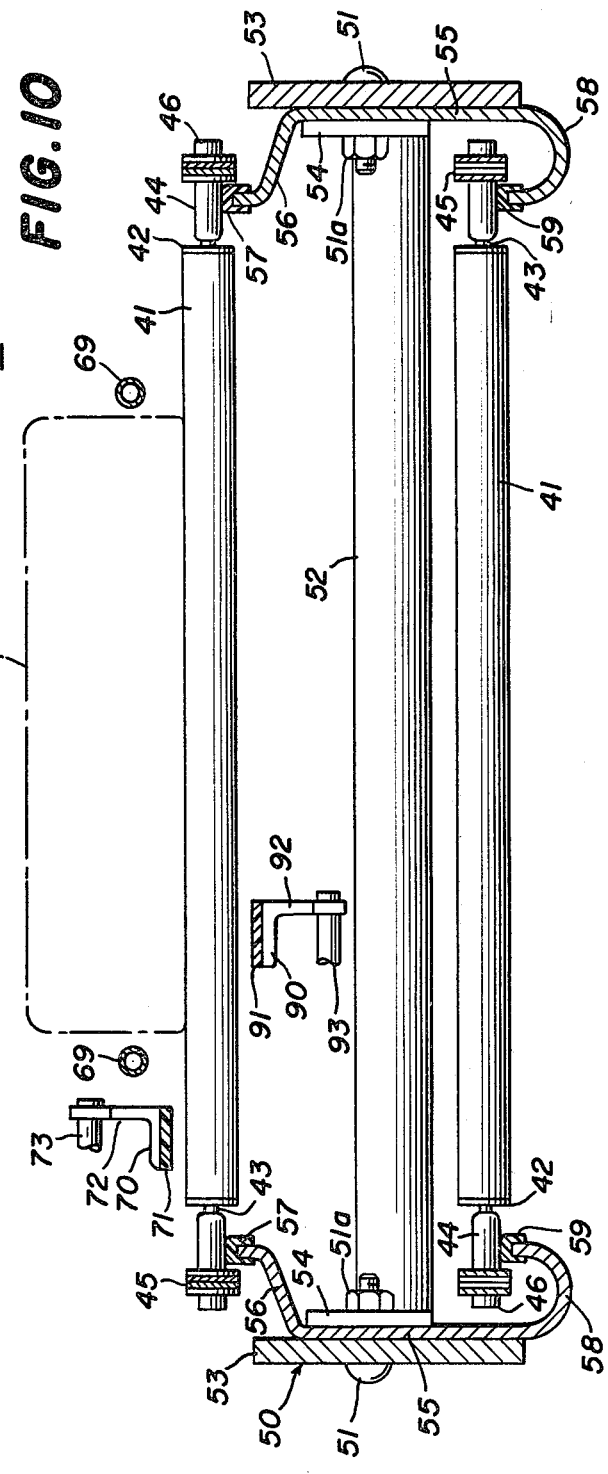

BREAD ACCUMULATOR

BACKGROUND OF THE INVENTION

The present invention relates to apparatus for accumulating into groups a series of spaced-apart conveyed articles. More particularly, the present invention is suitable for use in bakeries or the like for accumulating series of crushable articles such as freshly-baked loaves of bread. The present invention is specifically directed to conveying systems including endless belt roller conveyors.

Apparatus for changing the spacing between a series of articles conveyed on a roller conveyor is disclosed in the Australian Pat. No. 254,046, published Oct. 11, 1962, in which there is disclosed means for accelerating or decelerating some of the conveyed articles with respect to others by engaging the rollers within a predetermined zone with traction means for effecting rotation of the rollers to cause relative forward or backward movement of the conveyed articles with respect to the conveyor belt. But the Australian patent does not relate to accumulation of articles for conveying thereof as an accumulated group.

It is known that conveyed articles can be accumulated into a group by arresting the movement of the conveyed articles, the free rollers permitting the conveyor belt to continue moving beneath the arrested articles. But even with conveyor belts of interconnected free rollers, there is some friction in the bearings of the rollers and, therefore, as the number of accumulated articles increases, the pressure applied thereto can become significant. This is particularly true in the case of soft or crushable articles such as freshly baked loaves of bread, which will become crushed or deformed with the application thereto of relatively slight pressures. Thus, the prior art techniques are not suitable for accumulating large groups of articles such as freshly baked loaves of bread.

Summary of the Invention

The present invention relates to an apparatus for permitting accumulation of relatively large groups of crushable articles without crushing any of the individual articles.

More particularly, the present invention relates to apparatus for accumulating into a group a series of spaced-apart crushable articles conveyed by a roller conveyor, the accumulating being effected by arresting the movement of the lead articles and allowing the succeeding articles to accumulate therebehind, while at the same time providing means for preventing buildup of pressure on the accumulated articles.

It is an important feature of the present invention that, when the accumulated group has reached a predetermined size, the conveying force is removed from at least a portion of the group of accumulated articles.

It is another feature of this invention that, as the group of accumulated articles grows in length, the conveying force is sequentially removed from successive portions of the accumulated group.

It is another feature of this invention that when the group has reached a predetermined length, at least a portion of the group is released and conveyed as a group.

These features are provided, and it is an important object of this invention to attain these advantages by providing conveying apparatus for accumulating into a group a series of spaced-apart crushable articles being conveyed along a path and then conveying the accumulated articles as a group, the apparatus comprising conveying means applying a conveying force to the articles for movement thereof along the path, means for stopping the movement of the lead article in the series when it reaches a first predetermined point along the path so that succeeding articles in the series accumulate behind the lead article to form a contiguous group of articles, means responsive to accumulation of the group of articles to a predetermined second point upstream of the first point for removing the conveying force applied to the accumulated articles between the first and second points thereby to relieve the pressure on the accumulated articles, and releasing means for releasing the accumulated group of articles and reapplying conveying force to at least a portion thereof for conveying same in a group along the path, whereby the series of articles is accumulated into a contiguous group without crushing of individual articles.

Further features of the invention pertain to the particular arrangement of the parts of the conveying apparatus and the steps of the conveying method whereby the above-outlined and additional operating features thereof are attained.

The invention, both as to its organization and method of operation, together with further objects and advantages thereof will best be understood by reference to the following specification taken in connection with the accompanying drawings.

BRIEF DESCRIPTION OF THE DRAWINGS

FIG. 1 is a diagrammatic top plan view of a conveying system including an accumulating system in accordance with the present invention;

FIG. 2 is an enlarged top plan view of the accumulating system portion of the conveying system of FIG. 1;

FIG. 3 is a fragmentary side elevational view of the accumulating system of FIG. 2, shown just before the beginning of the accumulation cycle;

FIG. 8 is a view similar to FIG. 7, and illustrating the accumulation system when the fourth upper traction shoe has been lowered and the accumulation is complete;

FIG. 8 is a view similar to FIG. 8, and illustrating the accumulation system just after the first three upper traction shoes and the lower traction shoe have been raised and the accumulated group is being conveyed from the accumulation system;

FIG. 10 is a further enlarged fragmentary view in vertical section taken along the line 10—10 in FIG. 3.

DESCRIPTION OF THE PREFERRED EMBODIMENT

Figure 4:
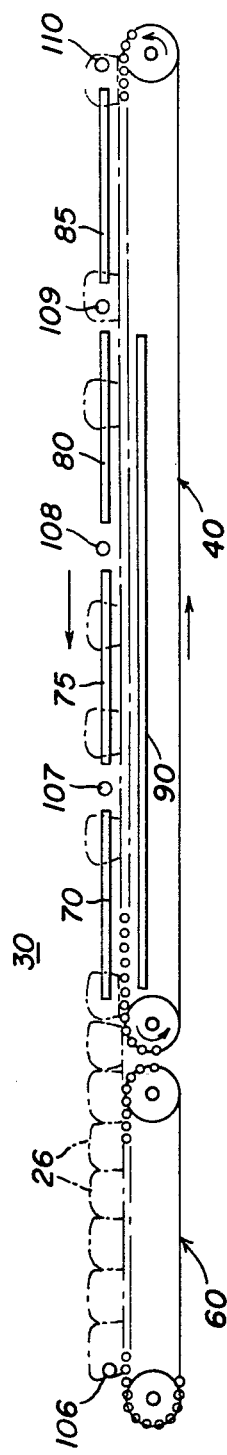
FIG. 4 is a view similar to FIG. 3, with the system illustrated shortly after the beginning of the accumulation cycle and before the first upper traction shoe has been lowered.
Figure 5:
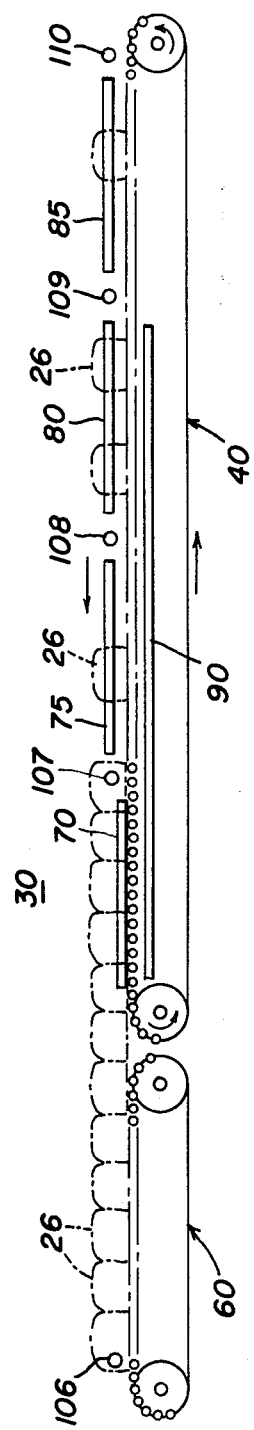
FIG. 5 is a view similar to FIG. 4, and illustrating the accumulation system when the first upper traction shoe has been lowered.
Figure 6:
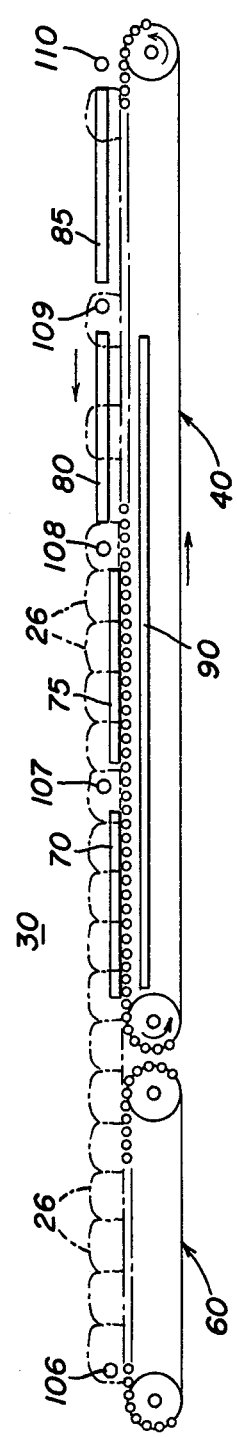
FIG. 6 is a view similar to FIG. 5, and illustrating the accumulation system when the second upper traction shoe has been lowered.
Figure 7:
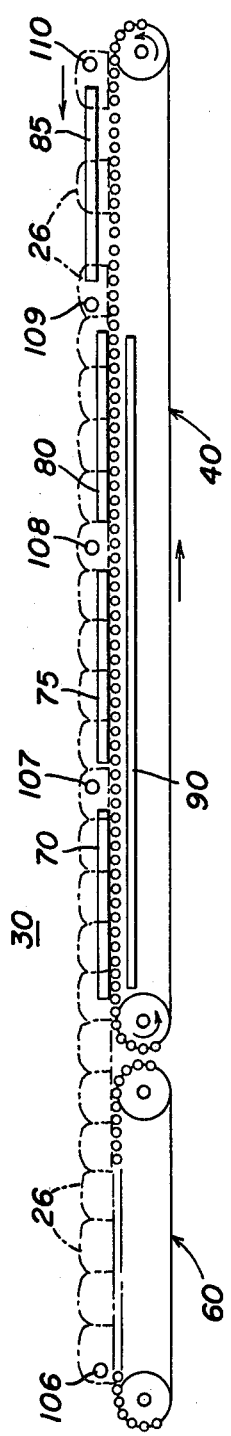
FIG. 7 is a view similar to FIG. 6, and illustrating the accumulation system when the third upper traction shoe has been lowered.

Referring now to FIG. 1 of the drawings, there is illustrated a conveying system, generally designated by the numeral 20, which may be of the type utilized in a large bakery for conveying freshly baked loaves 26 of bread from an infeed conveyor, generally designated by the numeral 25, to a cooler 27. The infeed conveyor 25 may be at the exit end of apparatus such as a depanning machine for removing the freshly baked loaves from the baking pans in which they are baked in an oven, the loaves 26 then being typically cooled in the cooler 27 before slicing and wrapping.

As the loaves 26 arrive on the infeed conveyor 25, they are typically disposed transversely of the conveyor 25 and are irregularly spaced apart longitudinally thereof. The cooler 27 has a limited capacity, indicated by the length D, and it is desirable to fit as many loaves 26 as possible into the cooler 27 to achieve optimum efficiency in use of the cooler 27. Thus, it is not practicable to convey the spaced-apart loaves 26 directly to the cooler 27 because the interloaf spaces are unduly large and represent wasted space.

Accordingly, the series of spaced-apart loaves 26 are conveyed to the cooler 27 by way of an accumulating system, generally designated by the numeral 30, for accumulating the loaves 26 into a contiguous group of loaves with no spaces therebetween, the group having a total length substantially equal to the longitudinal capacity D of the cooler 27, and then conveying that group onto the entry shelf 28 of the cooler 27.

Referring now also to FIGS. 2 and 3 of the drawings, the accumulating system 30 includes a main or entry conveyor 40, and a metering or exit conveyor 60, both carried by a main frame 50. In the illustrated embodiment the conveyors 40 and 60 are substantially similar in construction, with the exception that the metering conveyor 60 is substantially shorter than the main conveyor 40. Thus, only the main conveyor 40 will be described in detail, it being understood that the structure and function of the metering conveyor 60 is substantially identical to that of the entry conveyor 40. But it will be appreciated that the exit conveyor 60 may also be a belt-type conveyor.

Referring now also to FIG. 10 of the drawings, the main conveyor 40 is a powered endless belt conveyor made up of a plurality of interconnected free rollers 41, each of the rollers 41 being provided at the opposite ends thereof with bearings 42 for receiving through complementary openings therein a supporting rod 43. The ends of the rod 43 that extend beyond the bearings 42 carry rod end bearings 44 and outwardly of the rod end bearings 44 are disposed links 45 held in position by bearing collars 46. The links 45 at adjacent ends of the rollers 41 are interconnected by the rod end bearings 44 to form two parallel endless chains, each of which engages sprockets 47 and 48 of the opposite ends thereof for driving the main conveyor 40 in a counter-clockwise direction, i.e., to the left, as viewed in FIGS. 2 and 3. The driving force is imparted to the main conveyor 40 by a suitable electric drive motor 49 and associated chain and sprocket linkage.

The main frame 50 includes a pair of outer frame members 53 and cooperating inner frame members 54, each outer frame member 53 cooperating with the associated inner frame member 54 to clamp therebetween one of a pair of conveyor frames 55. More specifically, aligned openings are provided in the frame members 53, 54 and 55 to receive the shanks of bolts 51 which cooperate with nuts 51a for holding the parts in the desired positions. Interconnecting the inner frame members 54 and suitably secured thereto as by welding are one or more cross members 52.

The conveyor frame members 55 are identical in construction and each includes an angle portion 56 extending inwardly toward the opposite frame member 55 and carrying thereon an upper rail 57 formed of nylon that engages the rod end bearings 44 on the adjacent ends of the rods 43 to support the rollers 41 and the materials carried thereon while passing across the upper reach of the main conveyor 40. The conveyor frame members 55 also carry inwardly extending U-shaped portions 58 along the lower edges thereof that in turn carry lower rails 59, also formed of nylon. The lower rails 59 engage the rod end bearings 44 when the rollers 41 are moving along the lowermost reach of the main conveyor 40.

Figure 11:
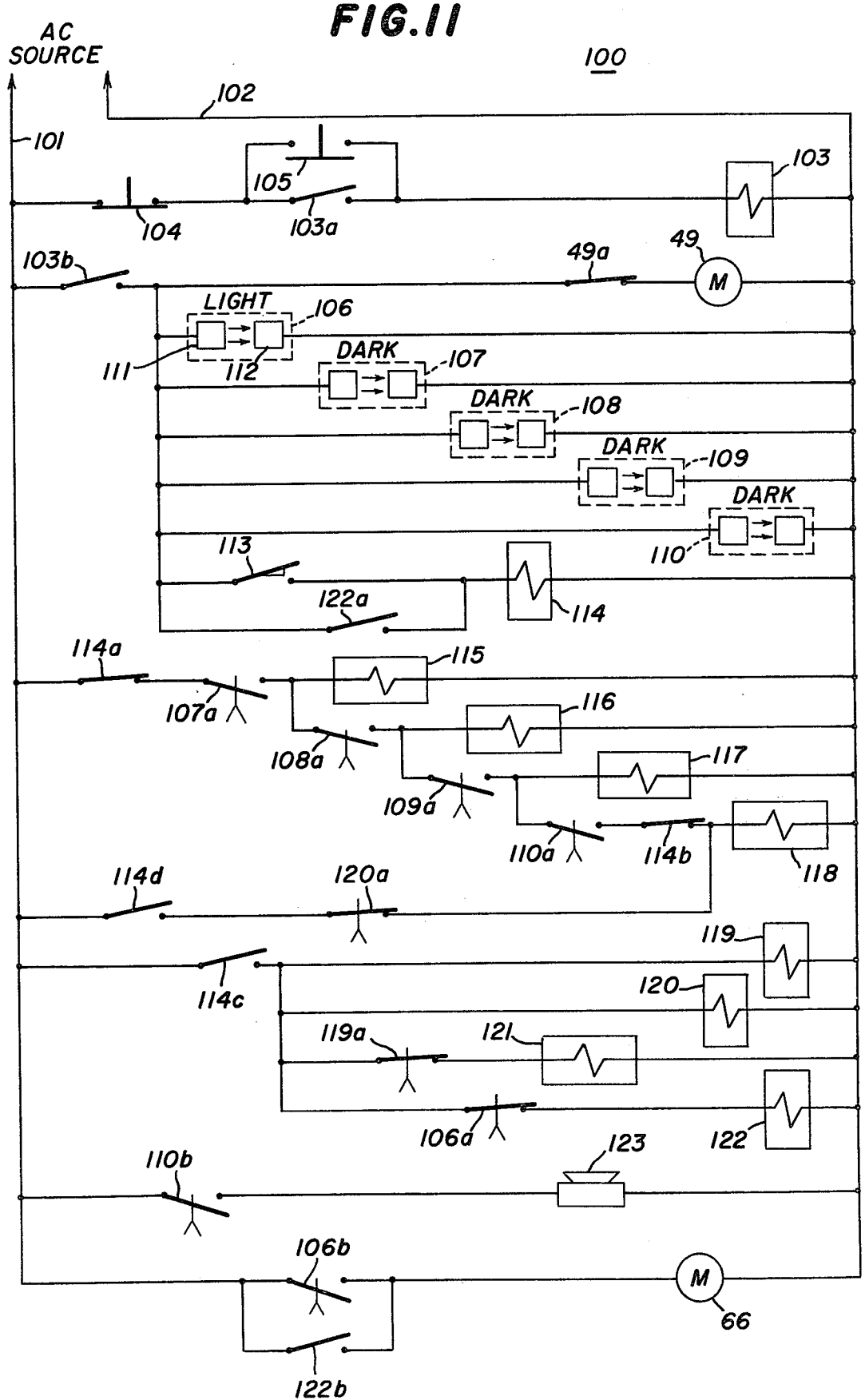
FIG. 11 is a schematic electrical circuit diagram of the control system of the present invention.

In like manner, the metering conveyor 60 includes a plurality of interconnected free rollers 65 forming an endless belt which is driven by a suitable drive motor 66 (FIG. 11). The belt of the conveyor 60 engages sprockets 67 and 68 at the opposite ends thereof, one of which sprockets is connected to the drive motor 66.

As illustrated in the drawings, the entry ends of each of the conveyors 40 and 60 are at the right-hand ends thereof, while the exit ends are at the left-hand ends thereof, the exit end of the main conveyor 40 being disposed closely adjacent to the entry end of the metering conveyor 60 so as to cooperate therewith to form a continuous straight path for conveying of the loaves 26. Preferably, a pair of laterally spaced-apart elongated guide rails 69 are disposed slightly above the upper reaches of the conveyors 40 and 60 along substantially the entire combined length thereof for guiding the loaves 26 and limiting movement thereof laterally of the conveyors 40 and 60.

Also disposed above the upper reach of the main conveyor 40 adjacent to one end of the rollers 41 are four longitudinally spaced-apart upper traction shoes 70, 75, 80 and 85 which are substantially identical in construction, wherefore only the traction shoe 70 will be described in detail. The traction shoe 70 includes an elongated member extending longitudinally of the main conveyor 40, and may be in the form of an angle iron, having one flange thereof disposed parallel to the article-supporting plane of the main conveyor 40 and having secured to the bottom surface thereof a friction pad 71. The other flange 72 of the traction shoe 70 is upstanding and is secured intermediate the ends thereof to a suitable support rod 73 which is in turn connected to an associated drive solenoid 115 which is schematically illustrated in FIG. 11, for movement of the traction shoe 70 between a retracted position, illustrated in FIG. 10, and an operating position disposed in frictional engagement with the upper surfaces of the rollers 41, and diagrammatically illustrated in FIGS. 5–8.

The upper traction shoes 75, 80 and 85 are respectively situated over corresponding accumulating zones of the main conveyor 40 and are each movable into and out of engagement with the rollers 41 in the same manner as was described with respect to the upper traction shoe 70.

There is also provided a lower traction shoe 90 which is disposed just beneath the upper flight of the main conveyor 40 but is otherwise similar in construction to the upper traction shoe 70. More particularly, the lower traction shoe 90 includes a friction pad 91 and a support flange 92 which is connected via a support rod 93 to a drive solenoid 121 (FIG. 11). The lower traction shoe 90 is movable between a retracted position illustrated in FIG. 10 and an operating position disposed in frictional engagement with the lower surfaces of the top flight of rollers 41 of the main conveyor 40, as diagrammatically illustrated in FIG. 9.

Referring now to FIG. 11 of the drawings, there is schematically illustrated the electrical control circuit, generally designated by the numeral 100, for controlling the accumulating system 30. The control circuit 100 includes power input lines 101 and 102 which are connected across a suitable source of AC electric power. Connected across the power lines 101 and 102 is the series combination of the winding of a control relay 103, its normally-open contacts 103a and a manually-operable normally-closed switch 104. Connected in parallel with the relay contacts 103a is a manually-operable ON-OFF switch 105. Also connected across the power lines 101 and 102 is the series combination of the drive motor 49 for the main conveyor 40 and its normally-closed overload contacts 49a and the normally-open contacts 103b of the control relay 103.

Each of the five photoelectric relays 106, 107, 108, 109 and 110 is connected in parallel with the drive motor 49 and its contacts 49a. Each of the photoelectric relays 106–110 includes an optical transmitter 111 and an optical receiver 112 which are respectively positioned at opposite sides of the conveying path of the accumulating system 30 and a slight distance thereabove so as to originate and terminate a light beam extending transversely of the conveyor path so as to be intercepted by loaves 26 being conveyed along the accumulating system 30. The photoelectric relay 106 is positioned adjacent to the exit end of the metering conveyor 60, while the photoelectric relays 107–110 are positioned along the main conveyor 40, with the relay 107 being disposed between the upper traction shoes 70 and 75, the relay 108 being disposed between the upper traction shoes 75 and 80, the relay 109 being disposed between the upper traction shoes 80 and 85, and the relay 110 being disposed adjacent to the entry end of the main conveyor 40 just upstream of the upper traction shoe 85. The photoelectric relay 106 is conditioned so as to be "energized" when the light beam thereof is uninterrupted, while each of the photoelectric relays 107–110 is conditioned to be "energized" after the light beam thereof is interrupted.

Connected in parallel with each of the photoelectric relays 106–110 is the series combination of normally open limit switch contacts 113 which are physically located in the cooler 27 and the winding of a control relay 114. Also connected across the power lines 101 and 102 is the series combination of the normally-closed contacts 114a of the control relay 114, normally-open, delayed-closing contacts 107a of the photoelectric relay 107 and a solenoid 115 for controlling the operation of the upper traction shoe 70. Connected in parallel with the solenoid 115 is the series combination of the normally-open, delayed-closing contacts 108a of the photoelectric relay 108 and a solenoid 116 for controlling the operation of the upper traction shoe 75. Connected in parallel with the solenoid 116 is the series combination of the normally-open, delayed-closing contacts 109a of the photoelectric relay 109 and a solenoid 117 for controlling the operation of the upper traction shoe 80.

Connected in parallel with the solenoid 117 is the series combination of the normally-open, delayed-closing contacts 110a of the photoelectric relay 110, the normally-closed contacts 114b of the control relay 114 and a solenoid 118 for controlling the operation of the upper traction shoe 85.

Also connected across the power lines 101 and 102 is the series combination of the normally-open contacts 114c of the control relay 114 and the winding of a time delay relay 119. Connected in parallel with the winding of the relay 119 is the winding of a time delay relay 120, the normally-closed, delayed-opening contacts 120a of which are connected in series with the normally-open contacts 114d of the control relay 114 between the power line 101 and the junction between the solenoid 118 and the relay contacts 114b. Connected in parallel with the winding of the relay 120 is the series combination of the normally-closed, delayed-opening contacts 119a of the relay 119 and a solenoid 121 for controlling the operation of the lower traction shoe 90. Also connected in parallel with the relay 120 is the series combination of the normally-closed, delayed-opening contacts 106a of the photoelectric relay 106 and the winding of a control relay 122, the normally-open contacts 122a of which are connected in parallel with the cooler limit switch contacts 113.

Also connected across the power lines 101 and 102 is the series combination of the normally-open, delayed-closing contacts 110b of the photoelectric relay 110 and an alarm horn or other audible signal device 123. Also connected across the power lines 101 and 102 is the series combination of the normally-open, delayed-closing contacts 106b of the photoelectric relay 106 and the drive motor 66 for the metering conveyor 60. Connected in parallel with the contacts 106b are the normally-open contacts 122b of the control relay 122.

Referring now to FIGS. 3 through 9 of the drawings, the operation of the accumulating system 30 will be described in detail. In order to turn on the system, the manual switch 105 is closed, thereby energizing the control relay 103 and closing its contacts 103a and 103b, the contacts 103a latching the relay 103 in an energized condition. Closure of the contacts 103b energizes the drive motor 49 for starting the main conveyor 40 and also turns on the photoelectric relays 106–110 for establishing the light beams thereof. Establishment of the light beam of the photoelectric relay 106 causes it to be energized and, after a predetermined time delay, open the contacts 106a thereof and close the contacts 106b thereof for energizing the drive motor 66 and starting the metering conveyor 60.

Initially, the series of loaves 26 is fed from the infeed conveyor 25 to the main conveyor 40 and then to the metering conveyor 60 toward the cooler 27. In FIG. 3, the first four loaves 26 in the series are shown as a contiguous group, the reason for which will be explained below. All of the traction shoes 70, 75, 80, 85 and 90 are disposed in their retracted positions out of engagement with the rollers 41 of the main conveyor 40. As the loaves 26 traverse the conveyors 40 and 60, they intercept the beams of the photoelectric relays 107–110, but the contacts of these relays are not actuated because they are all time delay contacts, the delay of which is set so that the contacts will not be actuated until the beam has been continuously interrupted for a time period greater than that required for the leading group of four loaves 26 to pass through the light beam at the speed of operation of the conveyor 40. But the photoelectric relay 106 is normally energized when its light beam is uninterrupted so, as the leading leaf 26 in the initial group of four loaves intercepts the light beam of the photoelectric relay 106, it is de-energized and the contacts 106a thereof immediately reclose and the contacts 106b immediately reopen to de-energize the drive motor 66 and stop the metering conveyor 60. Alternatively, the metering conveyor 60 may be stopped by a signal from the cooler 27, and a retractable barrier may be provided across the exit end of the conveyor 60.

The main conveyor 40 continues operating, however, and continues to convey loaves 26 into contact with the last loaf on the metering conveyor 60 and push the loaves therealong toward the initial group of four loaves, this movement of the loaves with respect to the metering conveyor 60 being accommodated by the free rotation of the rollers 65 thereof. When these loaves have been pushed up into contact with the initial group of four loaves, as illustrated in FIG. 4, the group of loaves 26 is sufficiently long and heavy that it cannot be moved anymore with respect to the metering conveyor 60. In other words, the friction in the bearings of the rollers of the main conveyor 40 is overcome and the main conveyor 40 rolls beneath the end loaves of the accumulated group as the group continues to accumulate on the main conveyor 40. But as the number of loaves accumulated on the conveyor 40 increases, the total force applied to the accumulated group by the conveyor 40 increases proportionately since the total length of the conveyor contact surface increases, and eventually this force will be sufficient to squeeze and deform and possibly even crush individual ones of the accumulated loaves 26 on the metering conveyor 60. It is a significant feature of the present invention that before this happens, the conveying force applied to the loaves accumulated on the main conveyor 40 is removed, thereby relieving the pressure on the loaves accumulated forward of the main conveyor 40.

For purposes of illustration, we will assume that when six of the loaves 26 have accumulated on the main conveyor 40, the total conveying force applied thereto is sufficient to begin to squeeze and deform the loaves on the metering conveyor 60. (It will, however, be appreciated that this number may vary widely depending upon the construction of the conveyor rollers and the nature of the articles being conveyed.) Therefore, the photoelectric relay 107 has been so positioned that when the group of accumulated loaves 26 has reached a length such that five of the loaves 26 have accumulated on the main conveyor 40, the fifth loaf thereon will lie in the beam of the photoelectric relay 107, interrupting it and energizing the photoelectric relay 107 for the time period necessary to close its delayed contacts 107a, thereby energizing the solenoid 115 for moving the upper traction shoe 70 to its operating position illustrated in FIG. 5, in engagement with the upper surfaces of the top flight of rollers 41 downstream of the photoelectric relay 107. Engagement of the upper traction shoe 70 with the rollers 41 serves to rotate the rollers 41 about their axes in a clockwise direction, as viewed in FIG. 5, at a peripheral speed which is equal to the forward speed of the conveyor chains, whereby the driving force of the main conveyor 40 is effectively cancelled in the accumulating zone of the upper traction shoe 70 and the conveying force of the main conveyor 40 is removed from the accumulated group of loaves in that zone.

Meanwhile, the main conveyor 40 continues to operate and the loaves 26 continue to accumulate, with the conveying force being applied only to those loaves which are disposed upstream of the upper traction shoe 70. It is another important feature of this invention that photoelectric relays 108–110 are spaced along the main conveyor 40 at approximately a five-loaf separation, i.e., the critical distance at which the conveying force imparted to the accumulated loaves by the conveyor 40 begins to cause deformation of the downstream loaves. Thus, when five loaves have accumulated behind the photoelectric relay 107, the fifth loaf will come to rest in the beam of the photoelectric relay 108, energizing it and causing its contacts 108a to close after the predetermined delay period to energize the solenoid 116, thereby moving the upper traction shoe 75 into its operative position in engagement with the rollers 41 of the main conveyor 40. Thus, the conveying force imparted to the loaves 26 accumulated in the zone of the upper traction shoe 75 between the photoelectric relays 107 and 108 is effectively cancelled in the same manner as was described above with respect to the upper traction shoe 70.

In like manner, when the loaves have accumulated to the photoelectric relay 109, its contacts 109a are closed to energize the solenoid 117 and move the upper traction shoe 80 into engagement with the conveyor rollers 41 (FIG. 7), and when the loaves have accumulated to the photoelectric relay 110, they intercept its beam for energizing that relay and closing its contacts 110a, thereby to energize the solenoid 118 and move the upper traction shoe 85 into engagement with the conveyor rollers 41 (FIG. 8).

When the group of accumulated loaves 26 has reached the photoelectric relay 109, it has reached a length D corresponding to the capacity of the cooler 27. Preferably, the length of time required to accumulate the group to the photoelectric relay 110 is substantially the same as the length of time needed to accommodate the previous group of loaves 26 in the cooler 27. At any rate, after the accommodation of the previous group, the cooler 27 will signal for the next group accumulated on the accumulation system 30 to be fed to the cooler 27. This signal is in the form of momentary closure of the switch 113 which energizes the control relay 114. Upon energization of the control relay 114, its contacts 114a and 114b open to de-energize the solenoids 115–117, thereby causing the upper traction shoes 70, 75 and 80 to be moved to their retracted positions and permit the conveying force of the main conveyor 40 to be reapplied to the loaves 26 accumulated thereon downstream of the photoelectric relay 109.

Simultaneously, the contacts 114d close to maintain the solenoid 118 energized so that the upper traction shoe 85 remains in engagement with the rollers 41. Also simultaneously, the contacts 114c, close to energize the control relays 119, 120 and 122 and the solenoid 121. Energization of the solenoid 121 causes movement of the lower traction shoe 90 into operative position in engagement with the bottom surfaces of the rollers 41 along the upper flight of the main conveyor 40, thereby urging them into rotation about their axes in a counterclockwise direction, as viewed in FIG. 9. After a predetermined short time period, the contacts 119a of the energized control relay 119 open to de-energize the solenoid 121 and retract the lower traction shoe 90. Thus, the rollers 41 are given only a momentary kick by the lower traction shoe 90 to stop their backward rotation and facilitate conveying of the accumulated group of loaves 26 from the accumulating system 30.

Energization of the control relay 122 causes immediate closure of its contacts 122a and 122b to hold the control relay 114 energized after the switch 113 reopens, and to re-energize the drive motor 66 and restart the metering conveyor 60. Thus, it will be appreciated that in response to the closure of the switch 113 in the cooler 27, there substantially simultaneously occurs the retraction of the upper traction shoes 70, 75 and 80, a momentary kick to the rollers 41 of the main conveyor 40 by the lower traction shoe 90, and restarting of the metering conveyor 60 so that all of the group of loaves 26 accumulated downstream of the photoelectric relay 109, which group has the length D, is conveyed into the cooler 27. It will be understood that, preferably, during this operation the conveying of loaves 26 to the accumulating system 30 by the infeed conveyor 25 continues, but it may be possible to stop the conveyor 25 on a signal from the system 20, in which case the apparatus for delaying the raising of the shoe 85 could be eliminated.

After the last loaf 26 in the accumulated group has passed the photoelectric relay 106, the beam thereof is reclosed for re-energizing the photoelectric relay 106, thereby first closing its contacts 106b to maintain the drive motor 66 energized to keep the metering conveyor 60 operating and then opening the contacts 106a to de-energize the control relay 122 and reopen its contacts 122b, the delay of the contacts 106a being slightly greater than that of the contacts 106b. It will be noted that the contacts 120a of the control relay 120 have a delay sufficient to permit the accumulated group of loaves 26 to be fed into the cooler 27, after which the contacts 120a open to de-energize the solenoid 118 and return the upper traction shoe 85 to its retracted position, thereby permitting the last four loaves accumulated on the main conveyor 40 to be conveyed therealong toward the metering conveyor 60. Preferably, simultaneously with the retraction of the upper traction shoe 85, the feeding of the series of spaced-apart loaves 26 from the infeed conveyor 25 is resumed and the system proceeds again to the configuration illustrated in FIGS. 2 and 3 to begin another accumulation cycle. The delay on the opening of the contacts 106a of the photoelectric relay 106 is such that it does not occur until the contacts 120a have opened. After this, the opening of the contacts 106a de-energizes the relay 122 for reopening its contacts 122a, thereby to de-energize the control relay 114. De-energization of the control relay 114 recloses its contacts 114a and 114b and reopens its contacts 114c and 114d, thereby to return the system to its initial condition.

The contacts 110b of the photoelectric relay 110 have a very long delay, set to be greater than the normal time necessary for the conveying of the accumulated group of loaves 26 into the cooler 27. If this does not take place within the prescribed time, the contacts 110b close to energize an alarm horn or siren 123 to indicate that there is some sort of a malfunction in the cooler 27 or elsewhere in the system.

While the present invention has been disclosed in connection with the accumulating of freshly baked loaves of bread in a bakery conveying line, it will be understood that it could be used for the accumulation of any soft or crushable articles. Also, while the present invention has utilized four accumulating zones on the main conveyor 40, it will be understood that any desired number of such zones may be used, depending upon the total length of the accumulated group of articles desired in a particular application.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Conveying apparatus for accumulating into a group a series of spaced-apart crushable articles being conveyed along a path and then conveying the accumulated articles as a group, said apparatus comprising conveying means including a low-friction entry conveyor and a low-friction exit conveyer arranged in end-to-end relationship to form a continuous portion of the path to apply a conveying force to the articles for movement thereof along the path, means for stopping said exit conveyor when the lead article in the series reaches a first predetermined point therealong, continued movement of said entry conveyor causing succeeding articles in the series to be moved relative to said exit conveyor therealong and to accumulate behind said lead article to form a contiguous group of articles, means responsive to accumulation of said group of articles to a predetermined second point along said entry conveyor for removing the conveying force applied by said entry conveyor to said accumulated articles between said first and second points thereby to relieve the pressure on said accumulated articles, releasing means for restarting said exit conveyor and reapplying conveying force to a portion of the articles accumulated on said entry conveyor thereby to convey the accumulated articles in a group along the path, and means for reapplying conveying force to the remainder of the accumulated articles for conveying same in a group along the path after the first portion of the accumulated articles has passed said first predetermined point, whereby the series of articles is accumulated into a contiguous group without crushing of individual articles.

2. The conveying apparatus set forth in claim 1, wherein said conveying means has four accumulating zones, said releasing means effecting release and conveying of only the accumulated articles in the foremost three of said accumulating zones.

3. The conveying apparatus set forth in claim 1, wherein said means for stopping said exit conveyor includes a photocell for sensing the presence of articles at said first point, said means responsive to accumulation of said group of articles to said second point includes a photo-cell for sensing the presence of an article at said second point for a predetermined period of time.

4. The conveying apparatus set forth in claim 1, wherein each of said entry and exit conveyors comprises a driven band of interconnected free rollers.

5. Conveying apparatus for accumulating into a group a series of spaced-apart crushable articles being conveyed along a path and then conveying the accumulated articles as a group, said apparatus comprising conveying means including a low-friction entry conveyor and a low-friction exit conveyor arranged in end-to-end relationship and forming a continuous portion of the path to apply a conveying force to the articles for movement thereof along the path, said entry conveyor having a plurality of accumulating zones arranged in end-to-end relationship thereon, means for stopping said exit conveyor when the lead article in the series reaches a first predetermined point therealong, continued movement of said entry coveyor causing succeeding articles in the series to be moved relative to said exit conveyor therealong and to accumulate behind said lead article to form a contiguous group of articles, a plurality of control means equal in number to and respectively corresponding to said accumulating zones, each of said control means being responsive to accumulation of said group of articles to a predetermined control point in the corresponding accumulating zone for removing the conveying force applied to said accumulated articles in said corresponding accumulating zone thereby to relieve the pressure on said accumulated articles, releasing means for restarting said exit conveyor and reapplying conveying force to the articles accumulated on said entry conveyor in the foremost ones of said accumulating zones, and means for reapplying conveying force to the remainder of the accumulated articles in a group along the path after the accumulated articles in the foremost ones of said accumulating zones have passed said first predetermined point thereby to convey at least a portion of the accumulated articles in a group along the path, whereby the series of articles is accumulated into a contiguous group without crushing of individual articles.

6. Conveying apparatus for accumulating into a group a series of spaced-apart crushable articles being conveyed along a path and then conveying the accumulated articles as a group, said apparatus comprising conveying means including an entry conveyor and an exit conveyor arranged in end-to-end relationship and forming a continuous portion of the path, each of said entry and exit conveyors including a driven band of interconnected free rollers to apply a conveying force to the conveyed articles for movement thereof along the path, said entry conveyor having a plurality of accumulating zones arranged in end-to-end relationship thereon, means for stopping said exit conveyor when the lead article in the series reaches a first predetermined point therealong, continued movement of said entry conveyor causing succeeding articles in the series to be moved relative to said exit conveyor therealong and to accumulate behind said lead article to form a contiguous group of articles, a plurality of traction means equal in number to and respectively corresponding to said accumulating zones, each of said traction means being movable into engagement with said rollers as they move through the corresponding zone to cause said rollers to rotate about their axes in a direction effectively to cancel the conveying force applied to conveyed articles in said corresponding zone by movement of said belt and cause said articles in said corresponding zone to remain stationary with respect to the path, a plurality of control means equal in number to and respectively corresponding to said accumulating zones, each of said control means being responsive to accumulation of said group of articles to a predetermined control point in the corresponding accumulating zone for moving the corresponding traction means into engagement with said rollers for removing the conveying force applied to said accumulated articles in said corresponding zone thereby to relieve the pressure on said accumulated articles, means for restarting said exit conveyor and moving said traction means out of engagement with said rollers in at least the foremost ones of said accumulating zones, and means for reapplying conveying force to the remainder of the accumulated articles in a group along the path after the accumulated articles in the foremost ones of said accumulating zones have passed said first predetermined point thereby to convey at least a portion of the accumulated articles in a group along the path, whereby the series of articles is accumulated into a contiguous group without crushing of individual articles.

7. The conveying apparatus set forth in claim 6, wherein each of said traction means includes a shoe disposed above said rollers and movable into engagement therewith along the uppermost surfaces thereof for effecting rotation of said rollers in a direction substantially opposite to the direction of movement of said band.

8. The conveying apparatus set forth in claim 6, wherein said means for stopping said exit conveyor includes a photocell for sensing the presence of articles at said first point, said means responsive to accumulation of said group of articles to said second point includes a photocell for sensing the presence of an article at said second point for a predetermined period of time.

9. The conveying apparatus set forth in claim 6, wherein each of said traction means includes a shoe disposed above said rollers and movable into engagement therewith along the uppermost surfaces thereof for effecting rotation of said rollers in a direction substantially opposite to the direction of movement of said band, and further including a starting shoe disposed beneath said rollers toward rotation in the same direction in which said band is moved.

10. The conveying apparatus set forth in claim 6, wherein said conveying means has four accumulating zones.

* * * * *

UNITED STATES PATENT AND TRADEMARK OFFICE
CERTIFICATE OF CORRECTION

PATENT NO. : 4,142,624

DATED : March 6, 1979

INVENTOR(S) : James A. Diver et al.

It is certified that error appears in the above-identified patent and that said Letters Patent are hereby corrected as shown below:

Column 2, line 59, "FIG. 8" (first occurrence) should be -- Fig. 9 --.
Column 10, line 16, "conveyer" should be --conveyor--.
Column 12, line 46, after "rollers" insert --for movement momentarily into engagement with said rollers from which said traction means have been disengaged by said releasing means for urging said rollers--.

Signed and Sealed this

Twenty-ninth Day of May 1979

[SEAL]

Attest:

RUTH C. MASON
Attesting Officer

DONALD W. BANNER
Commissioner of Patents and Trademarks